United States Patent
Lee et al.

(10) Patent No.: US 9,298,319 B2
(45) Date of Patent: Mar. 29, 2016

(54) MULTI-TOUCH RECOGNITION APPARATUS USING FILTERING AND A DIFFERENCE IMAGE AND CONTROL METHOD THEREOF

(71) Applicant: SAMSUNG ELECTRONICS CO., LTD., Suwon-si (KR)

(72) Inventors: Ji Hyo Lee, Yongin-si (KR); Kyung Shik Roh, Seongnam-si (KR); Young Bo Shim, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 383 days.

(21) Appl. No.: 13/760,314

(22) Filed: Feb. 6, 2013

(65) Prior Publication Data

US 2013/0201158 A1 Aug. 8, 2013

(30) Foreign Application Priority Data

Feb. 6, 2012 (KR) .................. 10-2012-0011831

(51) Int. Cl.
*G06F 3/042* (2006.01)
*G06T 7/20* (2006.01)

(52) U.S. Cl.
CPC ............ *G06F 3/0425* (2013.01); *G06T 7/2053* (2013.01); *G06T 2207/10048* (2013.01)

(58) Field of Classification Search
None
See application file for complete search history.

(56) References Cited

U.S. PATENT DOCUMENTS

| 7,432,917 B2 | 10/2008 | Wilson et al. |
| 2005/0089194 A1* | 4/2005 | Bell ............................... 382/103 |
| 2007/0177817 A1 | 8/2007 | Szeliski et al. |
| 2008/0150890 A1* | 6/2008 | Bell et al. ...................... 345/156 |
| 2010/0060722 A1* | 3/2010 | Bell ................................ 348/51 |
| 2010/0111439 A1* | 5/2010 | Fu ................................. 382/270 |

FOREIGN PATENT DOCUMENTS

| KR | 10-0504819 | 7/2005 |
| KR | 10-2008-0055577 | 6/2008 |
| KR | 10-2010-0110928 | 10/2010 |

* cited by examiner

*Primary Examiner* — Ilana Spar
*Assistant Examiner* — Kirk Hermann
(74) *Attorney, Agent, or Firm* — Harness, Dickey & Pierce, P.L.C.

(57) ABSTRACT

Disclosed herein are a multi-touch recognition apparatus and a control method thereof. The multi-touch recognition apparatus executes blur filtering for noise removal when an image is input through a camera unit photographing a screen of a display panel supporting multi-touch, calculates and outputs a difference image obtained by removing the background image stored in the storage unit from the blur-filtered image, calculates a new background image using the difference image and a binary image of the difference image, and updates the background image stored in the storage unit using the calculated new background image, thereby effectively removing a background other than multi-touch and thus improving multi-touch recognition performance.

20 Claims, 5 Drawing Sheets

MULTI-TOUCH RECOGNITION APPARATUS USING FILTERING AND A DIFFERENCE IMAGE AND CONTROL METHOD THEREOF

CROSS-REFERENCE TO RELATED APPLICATIONS

This application claims the benefit of Korean Patent Application No. 2012-0011831, filed on Feb. 6, 2012 in the Korean Intellectual Property Office, the disclosure of which is incorporated herein by reference.

BACKGROUND

1. Field

One or more embodiments of the present disclosure relate to a multi-touch recognition apparatus which recognizes multi-touch gesture on a display panel based on an output image of infrared cameras and a control method thereof.

2. Description of the Related Art

Touch recognition on a display panel is accomplished based on an output image of an infrared camera, and such an image may have the following characteristics and drawbacks.

First, the output image of the infrared camera includes a large amount of noise, as compared to general cameras. Such noise may lead to a touch recognition error.

Second, a screen itself of the display panel forms an image, and thus the image includes icons and display screen information of a background picture. The screen itself serves as noise in recognition of a touch by a human hand, thereby generating a touch recognition error and reducing sensitivity in touch recognition.

Third, if light of a specific wavelength, such as halogen light, enters the infrared camera, the infrared camera does not function normally. It may be a limit of an infrared sensor-based camera, and if light of a specific wavelength enters the camera, saturation is generated, an image serving as the basis for touch recognition is severely distorted, and thus execution of a recognition process is difficult.

Therefore, development of a touch recognition apparatus which solves the above and other drawbacks so as to have improved touch recognition performance, as compared to conventional touch recognition apparatuses, has been identified as being needed.

SUMMARY

Therefore, it is an aspect of the present disclosure to provide a multi-touch recognition apparatus which effectively removes a background other than multi-touch from an image captured by cameras photographing a screen of a display panel supporting multi-touch so as to improve multi-touch recognition performance, and a control method thereof.

Additional aspects of the disclosure will be set forth in part in the description which follows and, in part, will be obvious from the description, or may be learned by practice of the disclosure.

In accordance with one aspect of the present disclosure, a multi-touch recognition apparatus includes a display panel displaying an image, a camera unit acquiring an image to sense a user touch position on the display panel, a storage unit storing a background image, and a controller executing blur filtering for noise removal when the image acquired by the camera unit is input, calculating and outputting a difference image obtained by removing the background image stored in the storage unit from the blur-filtered image, calculating a new background image using the difference image and a binary image of the difference image, and updating the background image stored in the storage unit using the calculated new background image.

The controller may calculate an absolute value image obtained by converting pixel values of the difference image into absolute values, and output the calculated absolute value image.

The binary image of the difference image may be a binary image obtained by binarization of the absolute value image.

The controller may calculate a threshold value in calculation of the binary image by the following Equation 1.

$$Th = \text{Mean}(I(.)) + \text{alpha}*std(I(.)) \qquad \text{[Equation 1]}$$

Here, Th may be the threshold value, Mean(I(.)) may be the mean of the absolute value image of the difference image, alpha may be a weight for distribution of pixel values of the image, and std(I(.)) may be the standard deviation of the absolute value image of the difference image.

The controller may calculate the new background image by the following Equation 2.

$$Bk(x,y) = Bk-1(x,y) + \text{beta}*Dk(x,y) \qquad \text{[Equation 2]}$$

Here, Bk(x,y) may be the new background image, Bk−1(x, y) may be the previous background image, Dk(x,y) may be the binary image, and beta may be a weight.

The controller may set the weight so that pixels having a small change in the difference image have a higher weight value than pixels having a large change.

The controller may set the weight to a value less than 1 and to different values if the value of the binary image is 1 and if the value of the binary image is 0.

The controller may calculate the weight by the following Equation 3.

$$\text{beta} = a*(1-Hk(x,y)) + b*Hk(x,y) \qquad \text{[Equation 3]}$$

Here, Hk(x,y) may be the binary image, and a and b may be weights applied to the binary image.

In accordance with another aspect of the present disclosure, a control method of a multi-touch recognition apparatus which has a camera unit provided on a display panel displaying an image and acquiring an image to sense a user touch position on the display panel, and a storage unit storing a background image, includes executing blur filtering for noise removal when the image acquired by the camera unit is input, calculating and outputting a difference image obtained by removing the background image stored in the storage unit from the blur-filtered image, calculating a new background image using the difference image and a binary image of the difference image, and updating the background image stored in the storage unit using the calculated new background image.

The calculation and output of the difference image may include calculating an absolute value image obtained by converting pixel values of the difference image into absolute values, and outputting the calculated absolute value image.

The binary image of the difference image may be a binary image obtained by binarization of the absolute value image.

A threshold value in calculation of the binary image may be calculated by the following Equation 1.

$$Th = \text{Mean}(I(.)) + \text{alpha}*std(I(.)), \qquad \text{[Equation 1]}$$

Here, Th may be the threshold value, Mean(I(.)) may be the mean of the absolute value image of the difference image, alpha may be a weight for distribution of pixel values of the image, and std(I(.)) may be the standard deviation of the absolute value image of the difference image.

The new background image is calculated by the following Equation 2.

$$Bk(x,y)=Bk-1(x,y)+\text{beta}*Dk(x,y) \quad \text{[Equation 2]}$$

Here, Bk(x,y) may be the new background image, Bk−1(x, y) may be the previous background image, Dk(x,y) may be the binary image, and beta may be a weight.

The weight may be set so that pixels having a small change in the difference image have a higher weight value than pixels having a large change.

The weight may be set to a value less than 1 and to different values if the value of the binary image is 1 and if the value of the binary image is 0.

The weight may be calculated by the following Equation 3.

$$\text{beta}=a*(1-Hk(x,y))+b*Hk(x,y) \quad \text{[Equation 3]}$$

Here, Hk(x,y) may be the binary image, and a and b may be weights applied to the binary image.

In accordance with another aspect of the present disclosure, a method of acquiring and processing an image with a camera provided on a display to sense a user touch position on the display is disclosed. The method includes performing blur filtering on a current image of the user touch position acquired by the camera to obtain a blur-filtered image, calculating, by way of a processor, a difference image by removing a stored background image from the blur-filtered image, the stored background image having been previously acquired with the camera, and outputting the difference image to be used for recognition of the user touch position on the display panel.

In accordance with another aspect of the present disclosure, a display device is disclosed. The display device includes a display panel to display an image, a camera to acquire an image to sense a user touch position on the display panel, a storage unit to store a background image that was previously acquired with the camera, and a controller, to perform blur filtering on a current image of the user touch position acquired by the camera to obtain a blur-filtered image, to calculate, by way of a processor, a difference image by removing the background image stored in the storage unit from the blur-filtered image, and to use the difference image for recognition of the user touch position on the display panel.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
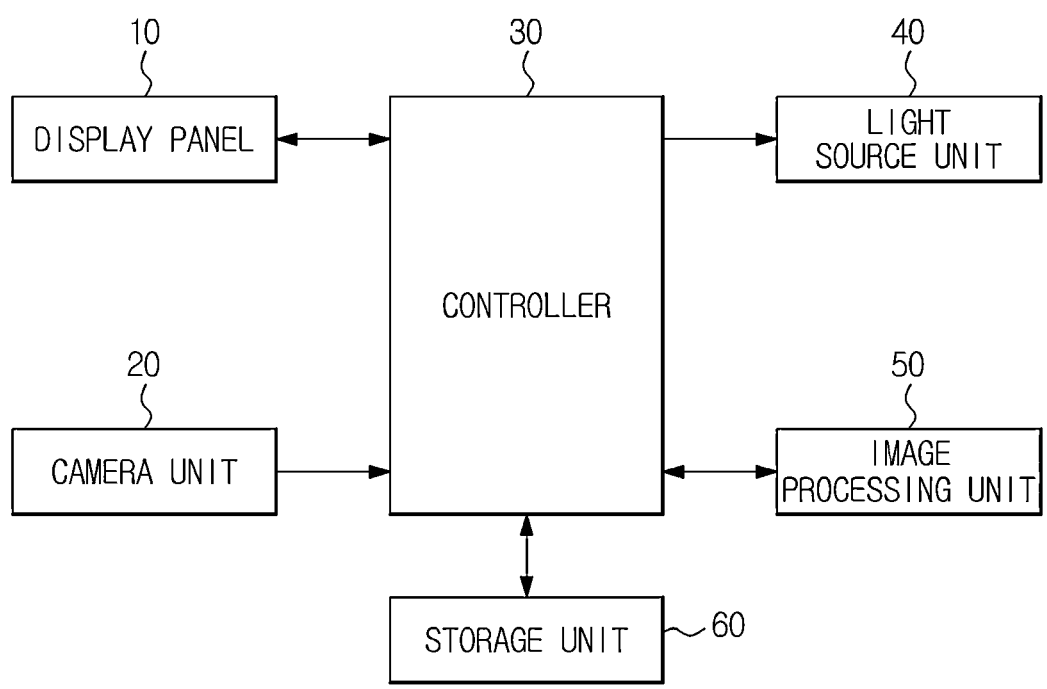
FIG. 1 is a schematic control block diagram of a multi-touch recognition apparatus in accordance with one embodiment of the present disclosure.

Reference will now be made in detail to embodiments of the present disclosure, examples of which are illustrated in the accompanying drawings, wherein like reference numerals refer to like elements throughout.

A multi-touch recognition apparatus in accordance with one embodiment of the present disclosure may include any type of electronic apparatus including a display panel having a multi-touch function. For example, the multi-touch recognition apparatus may include a TV, a digital TV, a general TV, a mobile PC, or a mobile electronic apparatus such as a mobile phone or tablet device. Further, the multi-touch recognition apparatus may include a table-top display, a large format display (LFD), digital signage, or a digital information display (DID).

FIG. 1 is a schematic control block diagram of the multi-touch recognition apparatus in accordance with an embodiment of the present disclosure.

As shown in FIG. 1, the multi-touch recognition apparatus may include, for example, a display panel 10, a camera unit 20, a controller 30, a light source unit 40, an image processing unit 50 and a storage unit 60.

The display panel 10 displays an image, and a user touch is input to the display panel 10, for example, when the user touches the display or places fingers or an object within a proximate distance above the display.

The camera unit 20 may acquire an image to sense a user touch position on the display panel 10. For example, when the light source unit 40 emits light to the display panel 10, diffused reflection occurs only at a portion of the display panel 10 in which user's fingers are located and total reflection occurs at the remaining portion on the display panel 10. The camera unit 20 may photograph an image of the display panel 10 to sense the user touch position by calculating the position of the portion of the display panel 10 where diffused reflection occurs.

If the light source unit 40 emits infrared light of a specific wavelength, the camera unit 20 may include a filter corresponding to the specific wavelength. Therefore, the camera unit 20 may transmit only light of the specific wavelength emitted from the light source unit 40 and filter out light of a bandwidth other than the specific wavelength.

The camera unit 20 may be an infrared camera array provided under the display panel 10 and may include a plurality of infrared cameras. The camera unit 20 photographs an image around a point where the user touch occurs on the display panel 10. The camera unit 20 may include an imaging device, such as a complementary metal-oxide semiconductor (CMOS) or a charge coupled device (CCD) formed of a material sensitive to infrared light, and a plurality of optical lenses.

The light source unit 40 is provided on the display panel 10 and generates light. Here, at least one light source unit 40 may be provided. For example, the light source unit 40 may be located at one or more corners of the display panel 10. Particularly, the light source unit 40 may be located at four corners of the display panel 10.

The light source unit 40 may be an infrared optical element upon which infrared light of a specific wavelength is incident. For example, the light source unit 40 may be an infrared optical element upon which infrared light of a specific wavelength of 850 nm, 880 nm or 940 nm is incident, although other wavelengths may alternatively be used.

The image processing unit 50 may process an image displayed on the display panel 10. The image processing unit 50 may process the image acquired through the camera unit 20 based on the user touch position and may display the processed image on the display panel 10.

The storage unit 60 stores a background image. Such a stored background image may be compared with an input image, i.e., the image acquired through the camera unit 20, by the controller 30, and may be used to acquire a difference image. Since no background image is present at first, an input image at first use is stored as the background image.

The controller 30 recognizes a user multi-touch position from the image acquired through the camera unit 20, and controls the image processing unit 50 based on the recognized multi-touch position so that an image according to instructions corresponding to the multi-touch position is displayed on the display panel 10.

In recognition of the user multi-touch position from the image acquired through the camera unit 20, the controller 30 removes noise from the image acquired through the camera 20 and effectively removes the background other than multi-touch through background removal and background update, thereby improving touch recognition performance.

Particularly, the controller 30 executes blur filtering of image data acquired through the camera unit 20 using a Gaussian filter so that noise is removed from the image data acquired through the camera unit 20 and an illumination component is suppressed so as to maintain high multi-touch recognition performance, and then executes an image processing algorithm to acquire image data in which the illumination component is suppressed and the background other than multi-touch has been removed. Blur filtering may be a process of smoothing an image by adding another pixel having a pixel value corresponding to an approximate value to the border between a pixel and a pixel forming the image.

For this purpose, the controller 30 removes the background image from the image data acquired through the camera unit 20 using an adaptive background estimation (ABE) algorithm so as to acquire a touched portion from the image. It facilitates touch recognition in general environments, even when light of a wavelength similar to a light emission unit of the infrared camera of the camera unit 20 enters, if the intensity of such light is not sufficiently high.

Further, the controller 30 acquires a difference image by comparing the blur-filtered input image with the background image stored in the storage unit 60, acquires a binary image over an absolute value image of the difference image in which pixel values of the difference image are converted into absolute values, and updates the background image stored in the storage unit 60 using the difference image together with a binary image to which a weight representing the quantity of changed portions of the current input image are reflected in the binary image is applied. For example, the background image is updated in a manner in which when the weight is large, the reflection rate of the changed portions of the current image in background update increases, and when the weight is small, the reflection rate of the changed portions of the current image in background update decreases, and the previous background image is updated using the updated background image. Thereafter, the next input image is controlled in a manner in which the next input image is compared with such an updated background image.

The multi-touch recognition apparatus in accordance with an embodiment of the present disclosure removes noise from the image data of the camera unit 20, suppresses the illumination component, and removes the background other than multi-touch, thereby improving multi-touch recognition performance.

For this purpose, operation of the multi-touch recognition apparatus in accordance with an embodiment of the present disclosure may be generally divided into two processes.

The first process is a blur filtering process to remove noise from the image acquired through the camera unit 20. For example, blur filtering may be executed by passing the image data through a blur filter. A Gaussian filter may be employed as the blur filter. In addition to the Gaussian filter, other low-pass filters may be employed.

The second process is a process of acquiring an image in which the illumination component is suppressed and the background other than multi-touch is removed. For this purpose, in an embodiment of the present disclosure, a touched portion is acquired from the image by removing the background image from the input image using the ABE algorithm. It facilitates touch recognition in general environments, even when light of a wavelength similar to a light emission unit of the infrared camera of the camera unit 20 enters, if the intensity of such light is not high.

Figure 2:
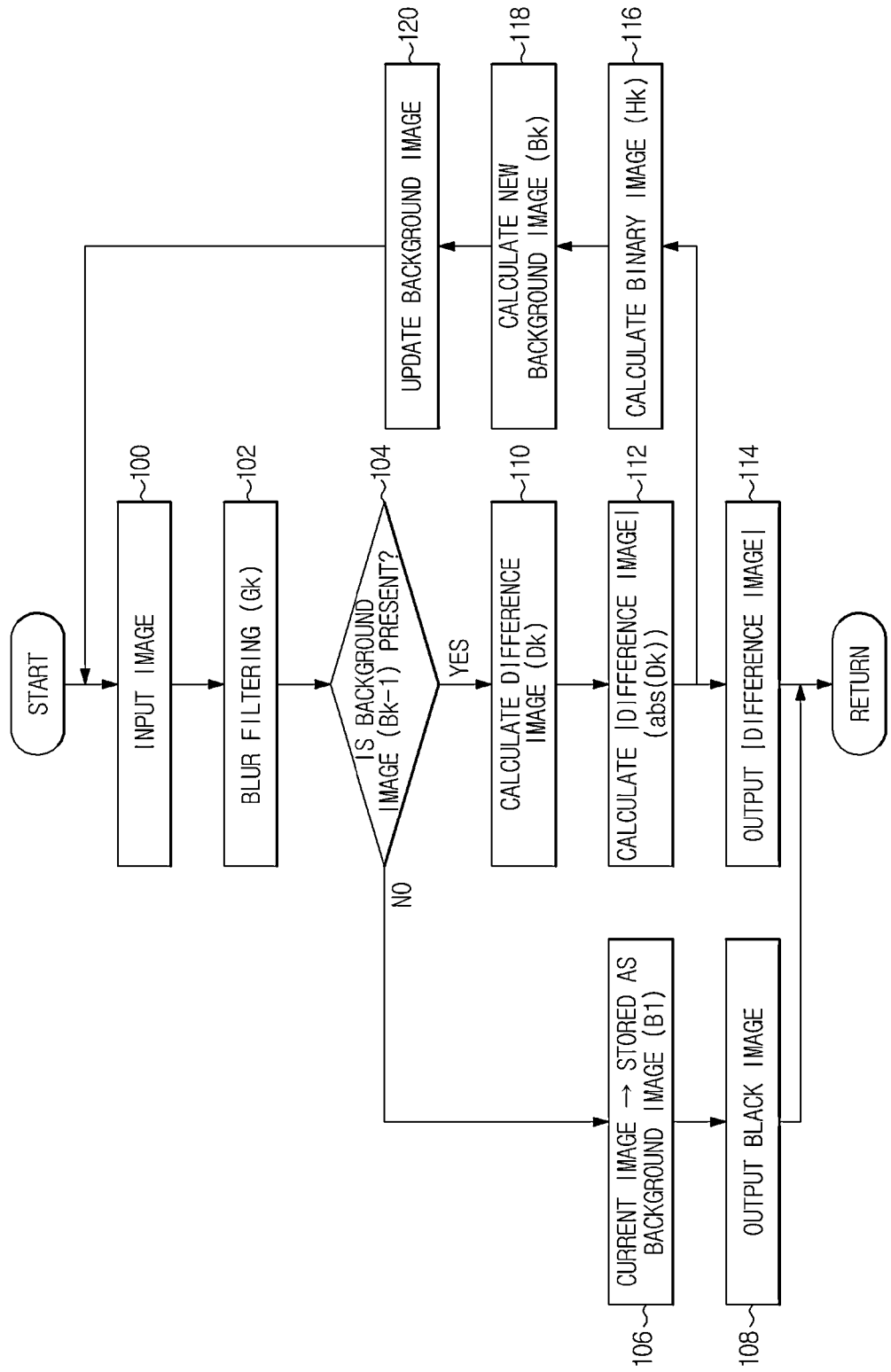
FIG. 2 is a flowchart illustrating a control method of the multi-touch recognition apparatus in accordance with an embodiment of the present disclosure.

FIG. 2 is a flowchart illustrating a control method of the multi-touch recognition apparatus in accordance with an embodiment of the present disclosure.

With reference to FIG. 2, first, the controller 30 receives an image photographed by the camera unit 20 according to an input of a user touch to the display panel 10 (Operation 100). Here, if the camera unit 20 includes a plurality of cameras, such an image may be one overall image including images photographed by each of the plurality of cameras.

Figure 3:
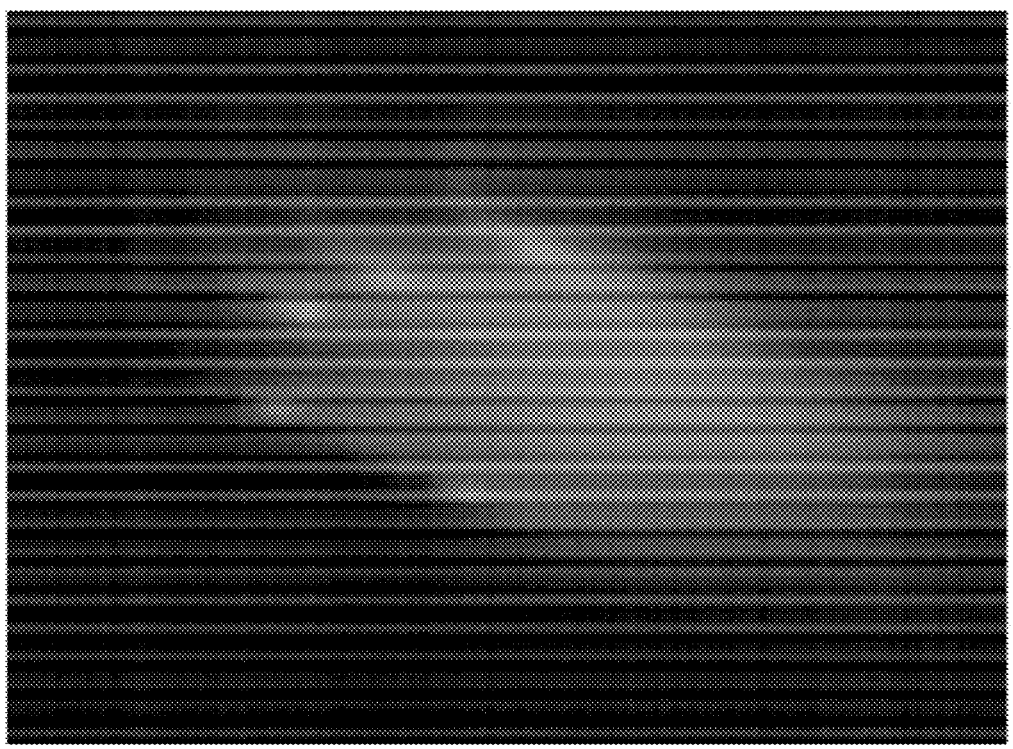
FIG. 3 is a view illustrating an input image prior to blur filtering in FIG. 2.
Figure 4:
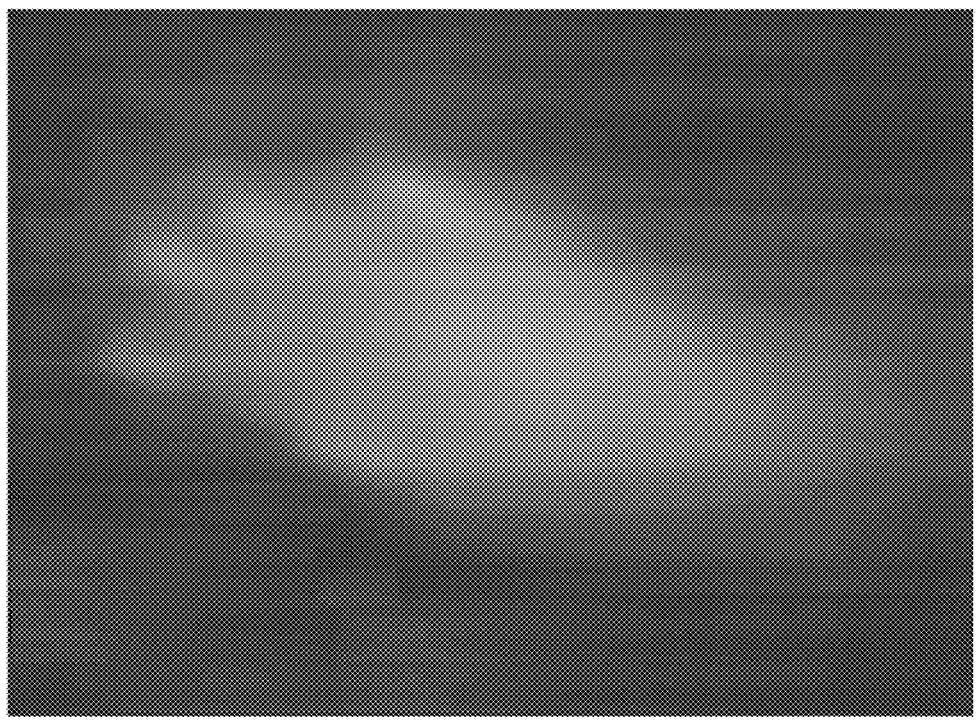
FIG. 4 is a view illustrating the input image after blur filtering in FIG. 2.

The image (hereinafter, referred to as an input image) input by the camera unit 20 may include various kinds of noise. Therefore, in order to remove such noise, the controller 30 executes blur filtering upon the input image (Operation 102). Various kinds of noise are removed from the input image by blur filtering (with reference to FIGS. 3 and 4). Here, FIG. 3 is a view illustrating an input image of multi-touch on the display panel by five fingers prior to blur filtering, and FIG. 4 is a view illustrating the blur-filtered input image of the five fingers input image. The blur-filtered image shown in FIG. 4 becomes an input image of a block to acquire a difference image which will be described later.

After the blur filtering, the controller 30 judges whether or not a background image is present in the storage unit 60 (Operation 104).

As a result of the judgment of Operation 104, if the background image is not present in the storage unit 60, i.e., if the input image is the first input image after start of the system, the blur-filtered image Gk is stored as the background image (Operation 106).

After the blur-filtered image Gk is stored as the background image B1, the controller 30 outputs a black image (Operation 108). After the black image is outputted, a first turn is completed, and the control method is returned to Operation 100 for a second turn. Here, the controller 30 recognizes user touch based on the output image. Since the user touch is not recognized based on the black image, it is judged that a touch has not been executed.

On the other hand, as the result of the judgment of Operation 104, if the background image Bk−1 is present in the storage unit 60, the controller calculates a difference image Dk between the current image Gk and the background image Bk−1 in order to separate user touch and the background from the blur-filtered image, i.e., the current image Gk (Operation 110). Such a difference image Dk is an image acquired by separating the background image Bk−1 from the current image Gk.

The difference image Dk is acquired through a difference between the current image Gk at an input terminal and the background image stored in the storage unit 60, as in the following Equation 1.

$$Dk(x,y)=Gk(x,y)-Bk(x,y)$$ [Equation 1]

Here, Dk(x,y) is the difference image, Gk(x,y) is the current image (the blur-filtered image), and Bk(x,y) is the background image.

After the difference image Dk is calculated, the controller 30 calculates an absolute value image abs(Dk) of the difference image Dk (Operation 112). In the difference image Dk, pixel values may be positive values (+) or negative values (−). The absolute value image abs(Dk) of the difference image Dk is acquired by converting the pixel values having negative values (−) into positive values (+), i.e., the absolute values.

Figure 5:
FIG. 5 is a view illustrating an absolute value image of a difference image in FIG. 2.

After the absolute value image abs(Dk) of the difference image Dk is acquired, the controller 30 outputs the absolute value image abs(Dk) of the difference image Dk (Operation 114). Here, the controller 30 recognizes a user touch based on the output image, i.e., the absolute value image abs(Dk) of the difference image Dk. FIG. 5 illustrates the absolute value image abs(Dk) of the difference image Dk. Since a user multi-touch is clearly shown in the absolute value image abs(Dk) of the difference image Dk, as compared with the blur-filtered image (with reference to FIG. 4), it may be confirmed that multi-touch recognition performance is improved.

Together with output of the absolute value image abs(Dk) of the difference image Dk, the controller 30 creates a binary image Hk of the absolute value image abs(Dk) of the difference image Dk for background update (Operation 116).

Binarization of the absolute value image abs(Dk) of the difference image Dk is a process of binarizing values of the absolute value image abs(Dk) of the difference image Dk into 0 and 1, and for this purpose, a binarization reference value, i.e., a threshold value, is required.

If the threshold value is set too low, even an input error is recognized and thus an image other than a touch is included, and if the threshold value is set too high, sensitivity is lowered and a touch similar to a background color is not recognized. Therefore, the threshold value may have the highest sensitivity within an input error allowable range of the cameras.

In general, a designated constant is generally used as the threshold value. However, in an embodiment of the present disclosure, the mean and standard deviation of the absolute value image abs(Dk) of the difference image Dk other than a constant may be used so as to actively cope with any change of circumstances.

The threshold value is calculated by the following Equation 2.

$$Th = \text{Mean}(I(.)) + \text{alpha} * std(I(.))$$ [Equation 2]

Here, Th is the threshold value, Mean(I(.)) is the mean of the absolute value image abs(Dk) of the difference image Dk, alpha is the weight for distribution of pixel values of the image, and std(I(.)) is the standard deviation of the absolute value image abs(Dk) of the difference image Dk.

When the binary image is acquired, a background update process is executed by combining current data. That is, after a new background image is acquired, the background image stored in the storage unit 60 is updated using the new background image.

After the binary image Hk is calculated, the controller 30 calculates a new background image Bk (Operation 118).

The new background image Hk may be calculated by the following Equation 3.

$$Bk(x,y) = Bk-1(x,y) + \text{beta} * Dk(x,y)$$ [Equation 3]

Here, Bk(x,y) is the new background image, Bk−1(x,y) is the previous background image, Dk(x,y) is the difference image, and beta is the weight representing how many changed portions of the current input image are reflected in background update. That is, when the weight is large, the reflection rate of the changed portions of the current image in background update increases, and when the weight is small, the reflection rate of the changed portions of the current image in background update decreases. The weight may be set to a value less than 1. The weight may also be set so that the pixels having a small change in the difference image have a higher weight value than the pixels having a large change.

Further, the weight beta is calculated by the following Equation 4.

$$\text{beta} = a * (1 - Hk(x,y)) + b * Hk(x,y)$$ [Equation 4]

Here, Hk(x,y) is the binary image, and a and b are weights applied to the binary image.

With reference to the above Equation 4, if the value of the binary image is 1 (there is a large change) and if the value of the binary image is 0 (there is little or no change), different weights are applied.

After the new background image Bk is created, the controller 30 updates the background by substituting the new background image Bk for the previous background image stored in the storage unit 60 (Operation 120). Thereby, the new background image Bk is stored in the storage unit 60. Such a new background image Bk is used to calculate a difference image of the next input image.

The control method according to the above-described embodiments may be recorded in non-transitory computer-readable media including program instructions to implement various operations embodied by a computer or processor. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the multi-touch recognition apparatus described herein.

As is apparent from the above description, in a multi-touch recognition apparatus and a control method thereof in accordance with one embodiment of the present disclosure, noise is removed from an image captured by cameras photographing a screen of a display panel supporting multi-touch using blur filtering, and a background other than multi-touch is effectively removed through background removal and background update, thereby improving multi-touch recognition performance.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A multi-touch recognition apparatus comprising:
   a display panel to display an image;

a camera unit to acquire an image to sense a user touch position on the display panel;

a storage unit to store a background image; and a controller to perform blur filtering for noise removal when the image acquired by the camera unit is input, to calculate and output a difference image obtained by removing the background image stored in the storage unit from the blur-filtered image, to calculate a new background image using the difference image, and to update the background image stored in the storage unit using the calculated new background image.

2. The multi-touch recognition apparatus according to claim 1, wherein the controller is configured to calculate an absolute value image obtained by converting pixel values of the difference image into absolute values, and output the calculated absolute value image.

3. The multi-touch recognition apparatus according to claim 2, wherein the controller is configured to calculate the new background image using the difference image and a binary image of the difference image, which is a binary image obtained by binarization of the absolute value image.

4. The multi-touch recognition apparatus according to claim 3, wherein the controller is configured to calculate a threshold value in the calculation of the binary image using the following equation:

$$Th = \text{Mean}(I(.)) + \text{alpha} * std(I(.)),$$

wherein Th is the threshold value, Mean($I(.)$) is the mean of the absolute value image of the difference image, alpha is a weight for distribution of pixel values of the image, and std($I(.)$) is a standard deviation of the absolute value image of the difference image.

5. The multi-touch recognition apparatus according to claim 1, wherein the controller is configured to calculate the new background image using the following equation:

$$Bk(x,y) = Bk-1(x,y) + \text{beta} * Dk(x,y),$$

wherein Bk(x,y) is the new background image, Bk-1 (x,y) is the previous background image, Dk(x,y) is the difference image, and beta is a weight.

6. The multi-touch recognition apparatus according to claim 5, wherein the controller is configured to set the weight so that pixels having a relatively small change in the difference image have a higher weight value than pixels having a relatively large change.

7. The multi-touch recognition apparatus according to claim 6, wherein the controller is configured to set the weight to a value less than 1 based on whether a value of a binary image is 1 or 0.

8. The multi-touch recognition apparatus according to claim 7, wherein the controller is configured to calculate the weight using the following equation:

$$\text{beta} = a*(1-Hk(x,y)) + b*Hk(x,y),$$

wherein Hk(x,y) is the binary image, and a and b are weights applied to the binary image.

9. A control method of a multi-touch recognition apparatus which has a camera unit provided on a display panel displaying an image and acquiring an image to sense a user touch position on the display panel, and a storage unit storing a background image, the control method comprising:

executing blur filtering for noise removal when the image acquired by the camera unit is input;

calculating and outputting a difference image obtained by removing the background image stored in the storage unit from the blur-filtered image;

calculating a new background image using the difference image; and updating the background image stored in the storage unit using the calculated new background image.

10. The control method according to claim 9, wherein the calculating and outputting of the difference image further comprises calculating an absolute value image obtained by converting pixel values of the difference image into absolute values, and outputting the calculated absolute value image.

11. The control method according to claim 10, wherein the calculating of the new background image further comprises calculating the new background image using the difference image and a binary image of the difference image, which is a binary image obtained by binarization of the absolute value image.

12. The control method according to claim 11, wherein a threshold value in the calculating of the binary image is calculated using the following equation:

$$Th = \text{Mean}(I(.)) + \text{alpha} * std(I(.)),$$

wherein Th is the threshold value, Mean($I(.)$) is the mean of the absolute value image of the difference image, alpha is a weight for distribution of pixel values of the image, and std($I(.)$) is the standard deviation of the absolute value image of the difference image.

13. The control method according to claim 9, wherein the new background image is calculated using the following equation:

$$Bk(x,y) = Bk-1(x,y) + \text{beta} * Dk(x,y),$$

wherein Bk(x,y) is the new background image, Bk-1 (x,y) is the previous background image, Dk(x,y) is the difference image, and beta is a weight.

14. The control method according to claim 13, wherein the weight is set so that pixels having a relatively small change in the difference image have a higher weight value than pixels having a relatively large change.

15. The control method according to claim 14, wherein the weight is less than 1, the weight being based on whether a value of a binary image is 1 or 0.

16. The control method according to claim 15, wherein the weight is calculated by the following equation:

$$\text{beta} = a*(1-Hk(x,y)) + b*Hk(x,y),$$

wherein Hk(x,y) is the binary image, and a and b are weights applied to the binary image.

17. At least one non-transitory medium comprising computer readable code to control at least one processor to implement the method of claim 9.

18. A method of acquiring and processing an image obtained with a camera provided on a display to sense a user touch position on the display, the method comprising:

performing blur filtering on a current image of the user touch position acquired by the camera to obtain a blur-filtered image;

calculating, by way of a processor, a difference image by removing a stored background image from the blur-filtered image, the stored background image having been previously acquired with the camera;

outputting the difference image to be used for recognition of the user touch position on the display panel;

calculating a new background image using the difference image; and updating the stored background image using the calculated new background image.

19. At least one non-transitory medium comprising computer readable code to control the processor to implement the method of claim 18.

20. A display device comprising:

a display panel to display an image;

a camera to acquire an image to sense a user touch position on the display panel;

a storage unit to store a background image that was previously acquired with the camera; and a controller, to perform blur filtering on a current image of the user touch position acquired by the camera to obtain a blur-filtered image, to calculate, by way of a processor, a difference image by removing the background image stored in the storage unit from the blur-filtered image, to use the difference image for recognition of the user touch position on the display panel, calculate a new background image using the difference image, and to update the background image stored in the storage unit using the calculated new background image.

* * * * *